US012475842B2

(12) United States Patent
Kwon et al.

(10) Patent No.: US 12,475,842 B2
(45) Date of Patent: Nov. 18, 2025

(54) DISPLAY DEVICE BASED ON AMPLIFIER OFFSET COMPENSATION AND OPERATING METHOD THEREOF

(71) Applicant: Samsung Electronics Co., Ltd., Suwon-si (KR)

(72) Inventors: Taeksu Kwon, Suwon-si (KR); Insuk Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/967,186

(22) Filed: Dec. 3, 2024

(65) Prior Publication Data

US 2025/0349251 A1 Nov. 13, 2025

(30) Foreign Application Priority Data

May 8, 2024 (KR) ........................ 10-2024-0060729

(51) Int. Cl.
*G09G 3/3225* (2016.01)
*G09G 3/00* (2006.01)

(52) U.S. Cl.
CPC ........... *G09G 3/3225* (2013.01); *G09G 3/006* (2013.01); *G09G 2310/0291* (2013.01); *G09G 2320/0693* (2013.01)

(58) Field of Classification Search
CPC ........... G09G 3/30-3291; G09G 3/006; G09G 3/3685-3692; G09G 2310/0291; G09G 2320/0693
See application file for complete search history.

(56) References Cited

U.S. PATENT DOCUMENTS 6,538,490 B2 3/2003 Yoshizawa
7,167,049 B2 1/2007 Lim
7,880,537 B2 2/2011 Kasai et al.
9,577,619 B2 2/2017 Kim et al.
10,460,683 B2 10/2019 Fujita
11,322,194 B2 5/2022 Someya et al.
2018/0315390 A1* 11/2018 Kong .................. G09G 3/3688
2019/0304395 A1* 10/2019 Kim ..................... G09G 3/3291

FOREIGN PATENT DOCUMENTS

KR 10-2005-0080585 A 8/2005
KR 10-2018-0004366 A 1/2018

* cited by examiner

*Primary Examiner* — Hang Lin
(74) *Attorney, Agent, or Firm* — Fish & Richardson P.C.

(57) ABSTRACT

A display device includes a first decoder configured to select a first input voltage based on one or more gamma voltages during a first calibration sequence of a plurality of calibration sequences, a first amplifier configured to generate and output a first output voltage during the first calibration sequence, the first output voltage generated by amplifying the first input voltage, a second decoder configured to select one or more first reference voltages based on the one or more gamma voltages during the first calibration sequence, a second amplifier configured to output a first comparison result during the first calibration sequence based on the first output voltage and the one or more first reference voltages, and processing circuitry configured to determine a first compensation value based on the first comparison result during the first calibration sequence, the first compensation value compensating for a first offset of the first output voltage.

20 Claims, 16 Drawing Sheets

DISPLAY DEVICE BASED ON AMPLIFIER OFFSET COMPENSATION AND OPERATING METHOD THEREOF

CROSS-REFERENCE TO RELATED APPLICATIONS

This U.S. non-provisional application claims the benefit of priority to Korean Patent Application No. 10-2024-0060729, filed on May 8, 2024, in the Korean Intellectual Property Office, the disclosure of which is incorporated by reference herein in its entirety.

BACKGROUND

Various example embodiments of the inventive concepts relate to a display device based on amplifier offset compensation, a system including the display device, and/or an operating method thereof.

An electronic device may provide visual information through a display device. The display device may include a display panel and a display driving circuit. The display driving circuit may control a display panel based on image data received from a host (e.g., a central processing unit (CPU), etc.) and the display panel may display an image corresponding to the image data according to the control of the display driving circuit.

SUMMARY

According to at least one example embodiment, a display driving circuit includes a first decoder configured to select a first input voltage based on one or more gamma voltages during a first calibration sequence of a plurality of calibration sequences, a first amplifier configured to generate and output a first output voltage during the first calibration sequence, the first output voltage generated by amplifying the first input voltage, a second decoder configured to select one or more first reference voltages based on the one or more gamma voltages during the first calibration sequence, a second amplifier configured to output a first comparison result during the first calibration sequence based on the first output voltage and the one or more first reference voltages, and processing circuitry configured to, determine a first compensation value based on the first comparison result during the first calibration sequence, the first compensation value compensating for a first offset of the first output voltage, and during the plurality of calibration sequences, set the second amplifier to have a polarity opposite of a polarity of the first amplifier.

According to at least one example embodiment, a display device includes a display driving circuit configured to generate at least one pixel signal corresponding to a display image, a display panel including a plurality of pixels, the display panel configured to display the display image based on the at least one pixel signal using the plurality of pixels, wherein the display driving circuit includes, a first decoder configured to select a first input voltage based on one or more gamma voltages during a first calibration sequence of a plurality of calibration sequences, a first amplifier configured to generate and output a first output voltage during the first calibration sequence, the first output voltage generated by amplifying the first input voltage, a second decoder configured to select one or more first reference voltages based on the one or more gamma voltages during the first calibration sequence, a second amplifier configured to output a first comparison result during the first calibration sequence based on the first output voltage and the one or more first reference voltages, processing circuitry configured to, determine a first compensation value based on the first comparison result during the first calibration sequence, the first compensation value compensating for a first offset of the first output voltage, and during the plurality of calibration sequences, set the second amplifier to have a polarity opposite of a polarity of the first amplifier, and the display driving circuit is further configured to generate the at least one pixel signal based on the first compensation value.

According to at least one example embodiment, a method of operating a display device includes selecting, by a first decoder, a first input voltage from one or more gamma voltages during a first calibration sequence of a plurality of calibration sequences, outputting, by a first amplifier, a first output voltage during the first calibration sequence, the first output voltage generated by amplifying the first input voltage, selecting, by a second decoder, one or more first reference voltages based on from the one or more gamma voltages during the first calibration sequence, generating, by a second amplifier, a first comparison result based on the first output voltage and the one or more first reference voltages during the first calibration sequence, determining, by processing circuitry, a first compensation value based on the first comparison result during the first calibration sequence, the first compensation value compensating for a first offset of the first output voltage, and setting, by the processing circuitry, the second amplifier to have a polarity opposite of a polarity of the first amplifier during the plurality of calibration sequences.

BRIEF DESCRIPTION OF THE DRAWINGS

The above and other aspects, features, and advantages of various example embodiments of the inventive concepts will be more apparent from the following detailed description, taken in conjunction with the accompanying drawings, in which.

DETAILED DESCRIPTION

Figure 1:
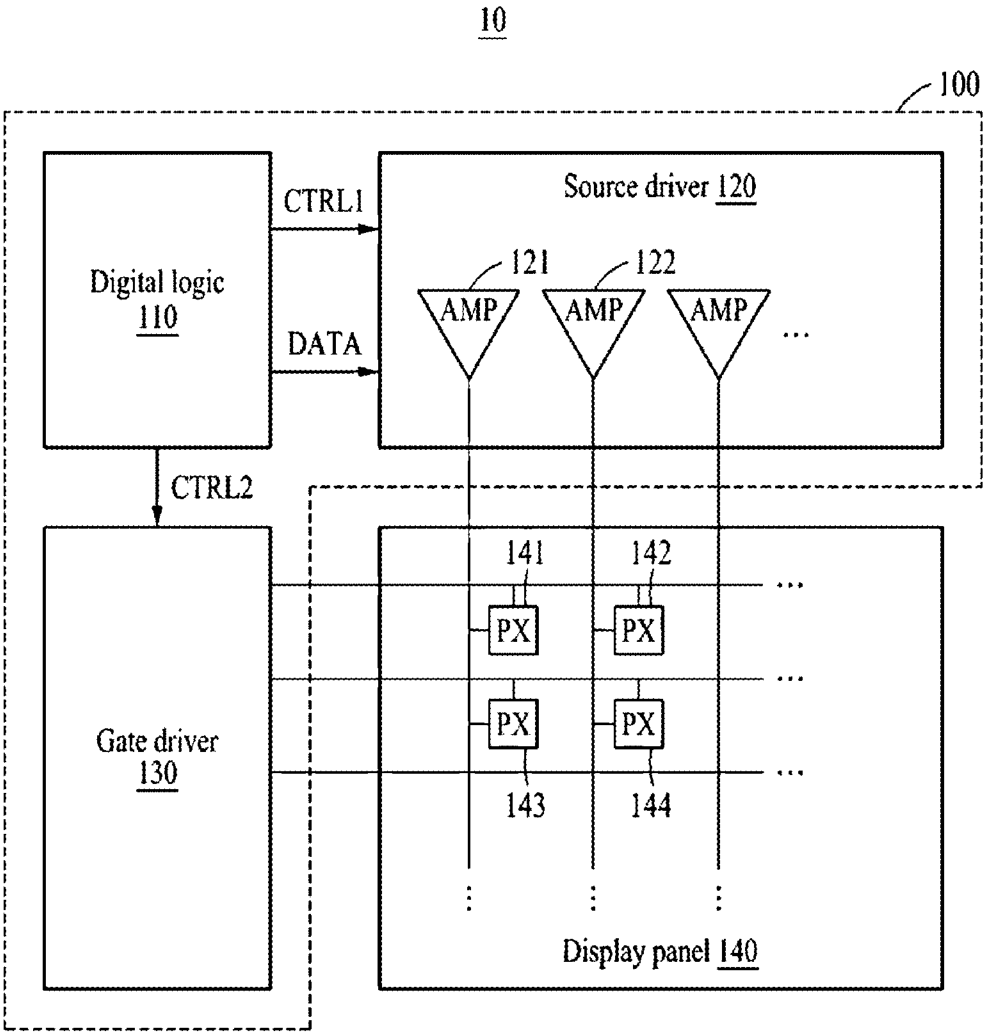
FIG. 1 is a diagram illustrating an example configuration of a display device according to at least one example embodiment.

Hereinafter, various example embodiments will be described in detail with reference to the accompanying drawings. When describing the example embodiments with reference to the accompanying drawings, like reference numerals refer to like elements and a repeated description related thereto will be omitted.

FIG. 1 is a diagram illustrating an example configuration of a display device according to at least one example embodiment. Referring to FIG. 1, a display device 10 may include a display driving circuit 100 (e.g., display driving circuitry) and a display panel 140, etc., but is not limited thereto, and for example, may include a greater or lesser number of constituent components. The display driving circuit 100 may generate a pixel signal corresponding to at least one display image, etc. The display image may be an image to be displayed using the display panel 140.

The display panel 140 may include pixels PX. The display panel 140 may display a display image corresponding to a pixel signal using the pixels PX. The display panel 140 may be a liquid crystal display (LCD) panel, a light-emitting diode (LED) display panel, an organic LED (OLED) display panel, and/or an active-matrix OLED (AMOLED) display panel, etc., but is not limited thereto. Hereinafter, a description is provided based on an example that the display panel 140 is an OLED display panel, but the example embodiments are not limited thereto.

The display driving circuit 100 may include a digital logic 110 (e.g., digital logic circuitry, etc.), a source driver 120, and/or a gate driver 130, etc., but is not limited thereto. In response to a request of a host, the digital logic 110 may provide, e.g., a first control signal CTRL1 and/or a data signal DATA to the source driver 120, and/or may provide a second control signal CTRL2 to the gate driver 130, etc., but is not limited thereto. According to some example embodiments, the digital logic 110, the source driver 120, and/or the gate driver 130, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The pixels PX may be in a lattice pattern. The gate driver 130 may select the pixels PX linewise (e.g., select a row of pixels or a column of pixels, etc.) using the second control signal CTRL2. The linewise may be rowwise, but is not limited thereto. The source driver 120 may provide a pixel signal to the selected pixels PX linewise by using the first control signal CTRL1 and/or the data signal DATA, etc. The pixels PX may display a display image linewise based on the pixel signal. When the pixel signal is provided to all lines of the display panel 140, one frame of the display image may be displayed.

The source driver 120 may include a plurality of amplifiers (AMPs). The amplifiers AMP may operate as unit gain buffers, but is not limited thereto. The one or more of the amplifiers AMP may generate an output voltage by amplifying an input voltage corresponding to the data signal DATA. A pixel signal corresponding to the output voltage may be provided to the plurality of pixels PX. The pixels PX may display the display image rowwise based on the pixel signal corresponding to the output voltage, but are not limited thereto. For example, when a first pixel 141 and a second pixel 142 of a first line are selected by the gate driver 130, a pixel signal may be provided to the first pixel 141 and the second pixel 142 by a first amplifier 121 and a second amplifier 122 of the amplifiers AMPs, etc., but the example embodiments are not limited thereto, and for example, a different number of pixels may be driven by a different number of amplifiers, etc. When a third pixel 143 and a fourth pixel 144 of the pixels PX are selected by the gate driver 130, a pixel signal may be provided to the third pixel 143 and the fourth pixel 144 by a first amplifier 121 and a second amplifier 122, etc.

The display device 10 may be implemented as at least a part and/or component of an electronic device, but the example embodiments are not limited thereto, and for example, the display device 10 may be a standalone device. For example, the electronic device may be implemented as at least a part and/or component of a mobile device such as a mobile phone, a smartphone, a personal digital assistant (PDA), a netbook, a laptop computer, a tablet, a wearable device such as a smartwatch, a smart band and/or smart glasses, etc., a computing device such as a desktop or a server, etc., a home appliance such as a television (TV), a smart TV or a refrigerator, etc., a security device such as a door lock, etc., and/or a vehicle such as an autonomous vehicle, a drone, a robot, or a smart vehicle, etc. A host may be included in an electronic device including the display device 10 and/or another electronic device separated from the electronic device and may control the display device 10 to display a display image, etc.

Figure 2:
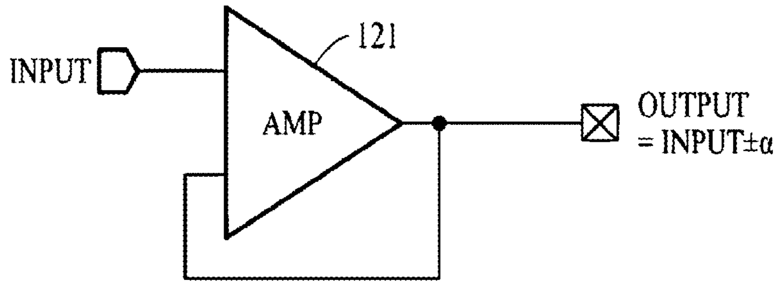
FIG. 2 is a diagram illustrating an example of an offset of an amplifier output according to at least one example embodiment.

FIG. 2 is a diagram illustrating an example of an offset of an amplifier output according to at least one example embodiment. Referring to FIG. 2, the amplifier 121 may output an output voltage OUTPUT by amplifying an input voltage INPUT. A description of the amplifier 121 may apply to other amplifiers of the source driver, but the example embodiments are not limited thereto.

A display driving circuit (e.g., mobile display integrated circuit (IC)) may include a plurality of channels according to and/or based on the resolution of the display panel. A deviation of voltage output (DVO) of a digital-analog converter (DAC) of the display driving circuit may be one of important performance features of the display driving circuit. The DAC may output a gamma voltage corresponding to a data signal as an output voltage OUTPUT. The amplifier 121 may drive pixels of the display panel through the output voltage OUTPUT as a unit gain buffer.

The output voltage OUTPUT may not be the same as (e.g., may be different than) the input voltage INPUT due to an offset a. For example, the output voltage OUTPUT may be a sum of the input voltage INPUT and the offset a. For example, the offset a may be a difference, deviation, loss, and/or error between the actual output voltage OUTPUT and the expected output voltage which may be caused by, for example, a mismatching transistor in the amplifier 121, etc., but is not limited thereto. The amplifier 121 of the display driving circuit (e.g., the mobile display IC) may be implemented as a rail-to-rail amplifier and may support various voltage ranges to drive pixels of the display panel, but the example embodiments are not limited thereto.

The DVO of the DAC due to the offset a of the output voltage OUTPUT may deteriorate, reduce, and/or negatively affect the resolution of the display. A method, such as changing the size of a matching transistor, etc., may be used to improve the DVO characteristics. The offset characteristics may be improved by changing the size of a transistor, but as a trade-off, an increase in the physical size of the chip containing the DAC may occur, the cost of the DAC may increase, etc. Various chopping methods may be used to improve the offset characteristics. The offset characteristics may be improved by a chopping method, but the chopping method may be difficult to use in a low-frequency display mode for low-power driving of the pixels of the display device, etc. According to one or more example embodiments, a compensation value may be determined through a calibration procedure and during a display operation of the display device, the offset a may be compensated and/or directly compensated for using the compensation value. Various example embodiments may be used for offset compensation of a low-frequency display mode, etc.

Figure 3:
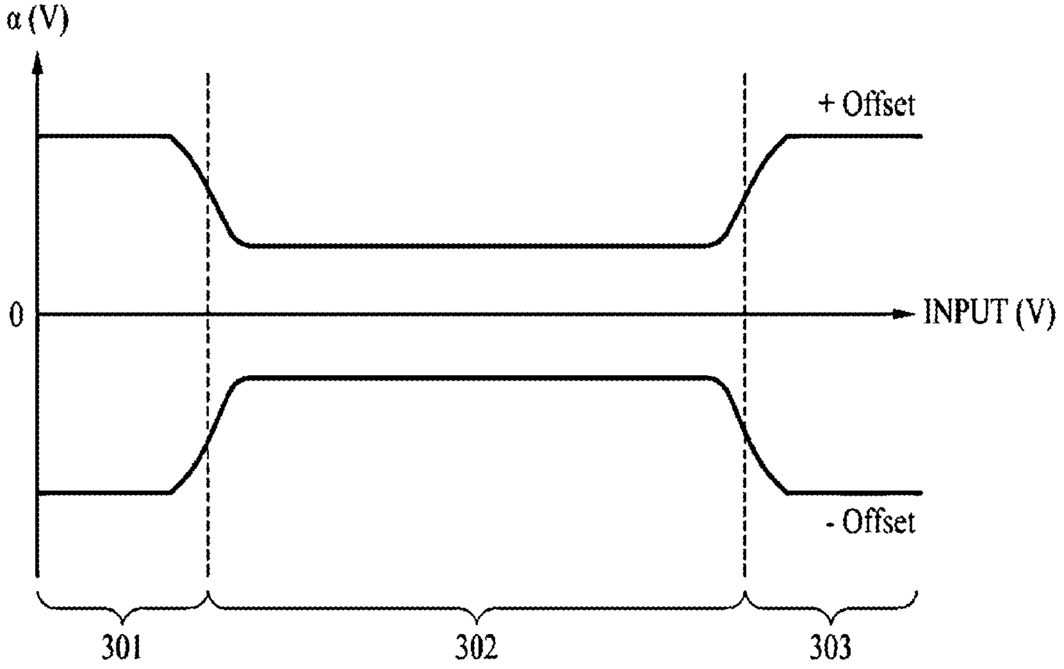
FIG. 3 is a diagram illustrating an example of an offset characteristic for each section of an amplifier output according to at least one example embodiment.

FIG. 3 is a diagram illustrating an example of an offset characteristic for each section of an amplifier output according to at least one example embodiment. Referring to FIG. 3, an output voltage of an amplifier may have different direct current (DC) offset characteristics for each section (e.g., portion, time period, etc.) of an input voltage. A first section 301 (e.g., a first portion, a first time period, etc.) may be a positive metal oxide semiconductor (PMOS) section in which a PMOS of the amplifier is used (or in other words, the first section 301 may correspond to a time period when a PMOS transistor of the amplifier is in operation, etc.), a second section 302 (e.g., a second portion, a second time period, etc.) may be a complementary MOS (CMOS) section in which a CMOS of the amplifier is used (or in other words, the second section 302 may correspond to a time period when a CMOS transistor of the amplifier is in operation, etc.), and a third section 303 may be a negative MOS (NMOS) section in which an NMOS of the amplifier is used (or in other words, the third section 303 may correspond to a time period when an NMOS transistor of the amplifier is in operation, etc.), but the example embodiments are not limited thereto. An offset of the second section 302 may be less than offsets of the first section 301 and/or the third section 303, but is not limited thereto. According to some example embodiments, offset compensation may be achieved based on offset characteristics of one or more sections of an input voltage, e.g., the first to third sections 301 to 303, etc.

Figure 4:
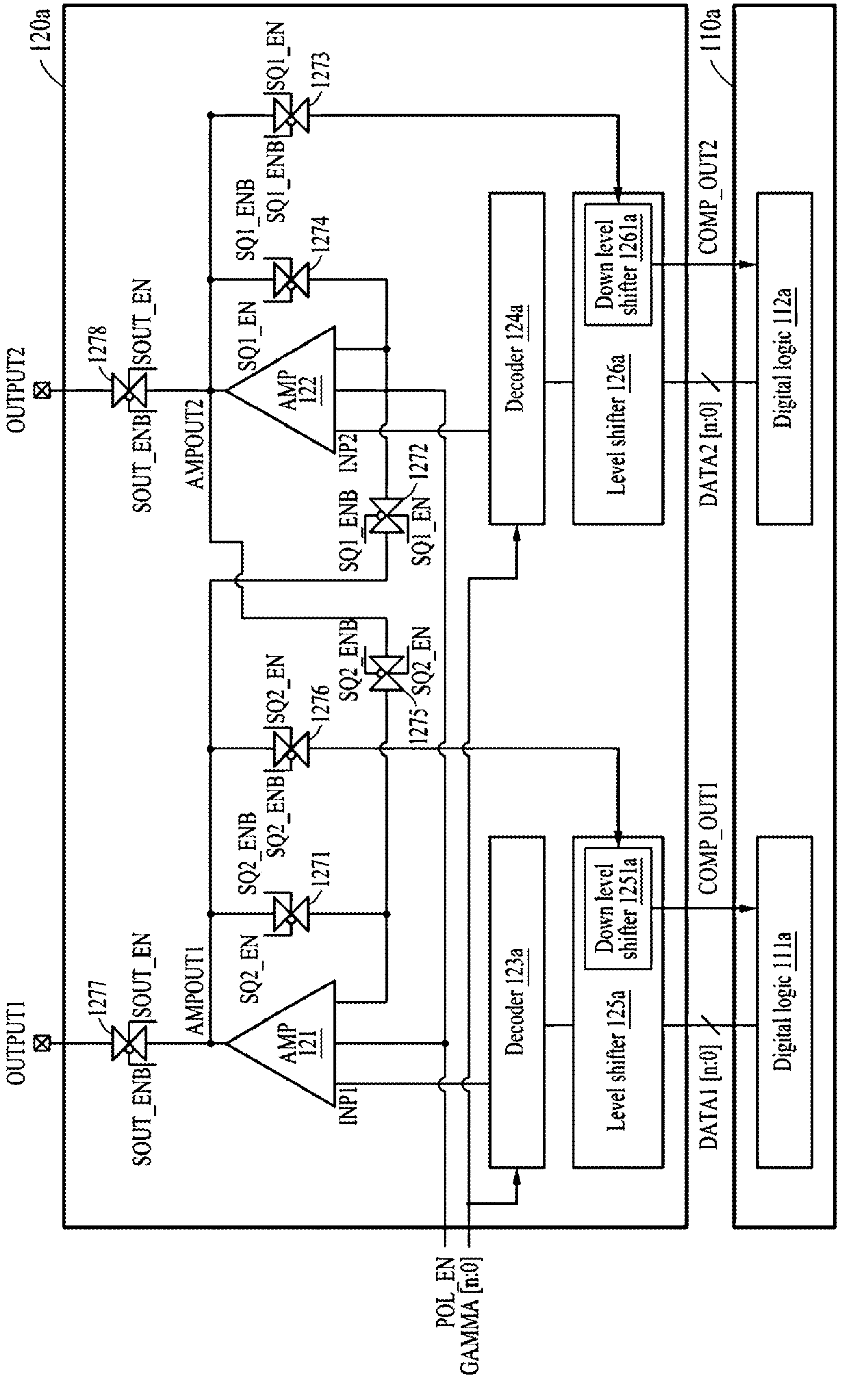
FIG. 4 is a diagram illustrating a digital logic and a configuration of a display driving circuit according to at least one example embodiment.

FIG. 4 is a diagram illustrating a digital logic and a configuration of a display driving circuit according to at least one example embodiment. Referring to FIG. 4, a source driver 120*a* may include the first amplifier 121, the second amplifier 122, a first decoder 123*a*, a second decoder 124*a*, a first level shifter 125*a*, and/or a second level shifter 126, etc., but is not limited thereto. The source driver 120*a* may perform a DAC operation, etc. A digital logic 110*a* may include a first digital logic 111*a* and/or a second digital logic 112*a*, etc., but is not limited thereto. According to some example embodiments, the digital logic 110*a*, the first digital logic 111*a*, the second digital logic 112*a*, the source driver 120*a*, the first amplifier 121, the second amplifier 122, the first decoder 123*a*, the second decoder 124*a*, the first level shifter 125*a*, and/or the second level shifter 126, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The first and second level shifters 125*a* and 126*a* may shift first and second data signals DATA1 and DATA2 provided by the first and second digital logics 111*a* and 112*a* to an analog level (e.g., analog signal, etc.). The first and second digital signals DATA1 and DATA2 may be digital signals including digital data of [n:0]. The first and second data signals DATA1 and DATA2 at a digital level may be shifted to analog signals at an analog level. The first and second level shifts 125*a* and 126*a* may include first and second down-level shifters 1251*a* and 1261*a*, but are not limited thereto. The first and second down-level shifters 1251*a* and 1261*a* may shift a signal at an analog level to a signal at a digital level, etc.

Offsets of the first and second amplifiers 121 and 122 may be determined through and/or using a plurality of calibration sequences. In the plurality of calibration sequences, one of the first and second amplifiers 121 and 122 may perform an amplification operation as an amplifier and the other amplifier may perform a comparison operation as a comparator. During the amplification operation, one of the first and second amplifiers 121 and 122 may output output voltages of first and/or second output signals AMPOUT1 and AMPOUT2 by amplifying an input voltage as a unit gain buffer, and during the comparison operation, as a comparator, the other amplifier of the first and second amplifiers 121 and 122 may output a comparison result as the first and/or second output signals AMPOUT1 and AMPOUT2, etc.

For example, the calibration sequences may include a first calibration sequence and a second calibration sequence, but is not limited thereto. In the first calibration sequence, the first amplifier 121 may perform an amplification operation, and the second amplifier 122 may perform a comparison operation, but are not limited thereto. An offset of the first amplifier 121 may be determined through the first calibration sequence. In the second calibration sequence, the second amplifier 122 may perform an amplification operation, and the first amplifier 121 may perform a comparison operation, etc. An offset of the second amplifier 122 may be determined through the second calibration sequence. After the first calibration sequence, the second calibration sequence may be performed or after the second calibration sequence, the first calibration sequence may be performed, etc.

The first and second decoders 123*a* and 124*a* may select a voltage from and/or selected based on a gamma signal GAMMA. The first and second decoders 123*a* and 124*a* may select a voltage indicated by and/or corresponding to the first and second data signals DATA1 and DATA2 based on the gamma signal GAMMA. The gamma signal GAMMA may include a gamma voltage corresponding to the digital data of [n:0]. During the amplification operation of the first amplifier 121, the first decoder 123*a* may select a first input voltage of the first amplifier 121 from and/or selected based on the one or more gamma voltages and during the comparison operation of the first amplifier 121, the first decoder 123*a* may select a second reference voltage of the first amplifier 121 from and/or selected based on the one or more gamma voltages. The first input voltage and the second reference voltage may be provided to the first amplifier 121 as a first input signal INP1. During the amplification operation of the second amplifier 122, the second decoder 125*a* may select a second input voltage of the second amplifier 122 from the and/or selected based on one or more gamma voltages and during the comparison operation of the second amplifier 122, the second decoder 124*a* may select a first reference voltage of the second amplifier 122 from and/or selected based on the one or more gamma voltages. The second input voltage and the first reference voltage may be provided to the second amplifier 122 as a second input signal INP2.

More specifically, the first decoder 123*a* may select a first input voltage of the first amplifier 121 from the and/or selected based on one or more gamma voltages of the gamma signal GAMMA generated based on the first data signal DATA1 in the first calibration sequence. The first amplifier 121 may output a first output voltage by amplifying the first input voltage in the first calibration sequence. The second decoder 124*a* may select first reference voltages from the and/or selected based on one or more gamma voltages of the gamma signal GAMMA in the first calibration sequence. The second decoder 124*a* may select the one or more gamma voltages around the and/or corresponding to the first input voltage and/or the first output voltage to be the first reference voltages. The second amplifier 122 may compare the first output voltage with the first reference voltages in the first calibration sequence and may output a first comparison result. For example, the first comparison result may be expressed as a high level (e.g., a Boolean logical "1" value, a TRUE value, etc.) or a low level (e.g., a Boolean logical "0" value, a FALSE value, etc.), but is not limited thereto. The second digital logic 112*a* may determine a first compensation value related to a first offset of the first output voltage based on the first comparison result in the first calibration sequence. The first compensation value may be a voltage value which may be used to reduce, correct, compensate for, and/or remove the first offset (e.g., the first compensation value may be used to reduce and/or correct the error in the first output voltage, etc.).

The second decoder 124*a* may select a second input voltage of the second amplifier 122 from and/or selected based on the one or more gamma voltages of the gamma signal GAMMA based on the second data signal DATA2 in the second calibration sequence. The second amplifier 122 may output a second output voltage by amplifying the second input voltage in the second calibration sequence. The first decoder 123*a* may select second reference voltages from and/or selected based on the one or more gamma voltages of the gamma signal GAMMA in the second calibration sequence. The first decoder 123*a* may select the second input voltage and/or the one or more gamma voltages around the second output voltage to be the second reference voltages. The first amplifier 121 may compare the second output voltage with the second reference voltages in the second calibration sequence and may output a second comparison result. For example, the second comparison result may be expressed as a high level or a low level, but is not limited thereto. The first digital logic 111*a* may determine a second compensation value related to a second offset of the second output voltage based on the second comparison result in the second calibration sequence. The second compensation value may have a voltage value to reduce, correct, compensate for, and/or remove the second offset (e.g., the second compensation value may be used to reduce and/or correct the error in the second output voltage, etc.).

The source driver 120*a* may include a plurality of switches, e.g., first to eighth switches 1271 to 1278, etc., configured to provide connection paths in a plurality of calibration sequences. For example, one or more of the first to eighth switches 1271 to 1278 may be referred to as switch circuits, etc. The switch circuit may provide a first connection path to cause the first amplifier 121 to output the first output voltage of the first output signal AMPOUT1 by amplifying the first input voltage of the first input signal INP1 and the second amplifier 122 to compare the first output voltage with the first reference voltages of the second input signal INP2, but the example embodiments are not limited thereto. The switch circuit may provide a second connection path to cause the second amplifier 122 to output the second output voltage of the second signal AMPOUT2 by amplifying the second input voltage of the second input signal INP2 and the first amplifier 121 to compare the second output voltage with the second reference voltages of the first input signal INP1, but the example embodiments are not limited thereto. The switch circuit may be controlled by a plurality of sequence control signals, e.g., sequence control signals SQ1_EN, SQ1_ENB, SQ2_EN, SQ2_ENB, SOUT_EN, and SOUT_ENB, etc., but is not limited thereto. For example, the digital logic may generate the plurality of sequence control signals and/or control the switch circuits using the plurality of sequence control signals, but the example embodiments are not limited thereto.

The first and second amplifiers 121 and 122 may each include a first input terminal configured to respectively receive the first and second input signals INP1 and INP2 of the input voltage or the reference voltage, a second input terminal configured to respectively receive the first and second output signals AMPOUT1 and AMPOUT2 of the output voltage, a polarity control terminal configured to receive a polarity control signal POL_EN, and/or an output terminal configured to respectively output the first and second output signals AMPOUT1 and AMPOUT2 of the output voltage, etc., but are not limited thereto.

The switch circuit may include at least one of the first switch 1271 on a feedback loop of the first amplifier 121, the second switch 1272 between an output terminal of the first amplifier 121 and a second input terminal of the second amplifier 122, the third switch 1273 between an output terminal of the second amplifier 122 and the second level shifter 126*a*, the fourth switch 1274 on a feedback loop of the second amplifier 122, the fifth switch 1275 between the output terminal of the second amplifier 122 and a second input terminal of the first amplifier 121, the sixth switch 1276 between the output terminal of the first amplifier 121 and the first level shifter 125*a*, the seventh switch 1277 between the output terminal of the first amplifier 121 and a first output terminal of the source driver 120*a*, and/or the eighth switch 1278 between the output terminal of the second amplifier 122 and a second output terminal of the source driver 120*a*, but the example embodiments are not limited thereto.

A first pixel signal OUTPUT1 may be output through the first output terminal of the source driver 120*a* according to and/or based on the first output signal AMPOUT1 of the first amplifier 121, and a second pixel signal OUTPUT2 may be output through the second output terminal of the source driver 120*a* according to and/or based on the second output signal AMPOUT2 of the second amplifier 122. Although FIG. 4 illustrates that the first to eighth switches 1271 to 1278 are CMOS switches, the type of the first to eighth switches 1271 to 1278 is not limited thereto.

In the first calibration sequence, the first switch 1271, the second switch 1272, and the third switch 1273 may be turned on using respective sequence control signals, and the fourth switch 1274, the fifth switch 1275, and the sixth switch 1276 may be turned off using respective sequence control signals, but the example embodiments are not limited thereto. In the second calibration sequence, the first switch 1271, the second switch 1272, and the third switch 1273 may be turned off using respective sequence control signals, and the fourth switch 1274, the fifth switch 1275, and the sixth switch 1276 may be turned on using respective sequence control signals, but the example embodiments are not limited thereto. In the calibration sequences, the seventh switch 1277 and the eighth switch 1278 may be turned off using respective sequence control signals, but are not limited thereto. The switches may be turned on while in a closed state, and may be turned off while in an open state.

The source driver 120*a* may further include amplifiers other than the first and second amplifiers 121 and 122. The descriptions of the first and second amplifiers 121 and 122 may apply to other amplifiers of the source driver 120*a*.

In FIG. 4, the first amplifier 121 and the second amplifier 122 may correspond to a calibration pair. The calibration pair may be amplifiers determining offsets of each other by alternately performing the amplification operation and the comparison operation. The calibration pair may include amplifiers sharing the same gamma lines, but are not limited thereto. For example, the calibration pair may include amplifiers for a red pixel in a red, green, blue (RGB) separate gamma, amplifiers for a green pixel, and amplifiers for a blue pixel, etc., but are not limited thereto. As another example, the calibration pair may include amplifiers of an adjacent channel in a 1-set gamma, etc.

Although FIG. 4 illustrates an example that the first and second amplifiers 121 and 122 perform the amplification operation and the comparison operation in the first and second calibration sequences, n amplifiers may perform the amplification operation and the comparison operation in n calibration sequences, wherein n may be greater than or equal to 2.

Figure 5:
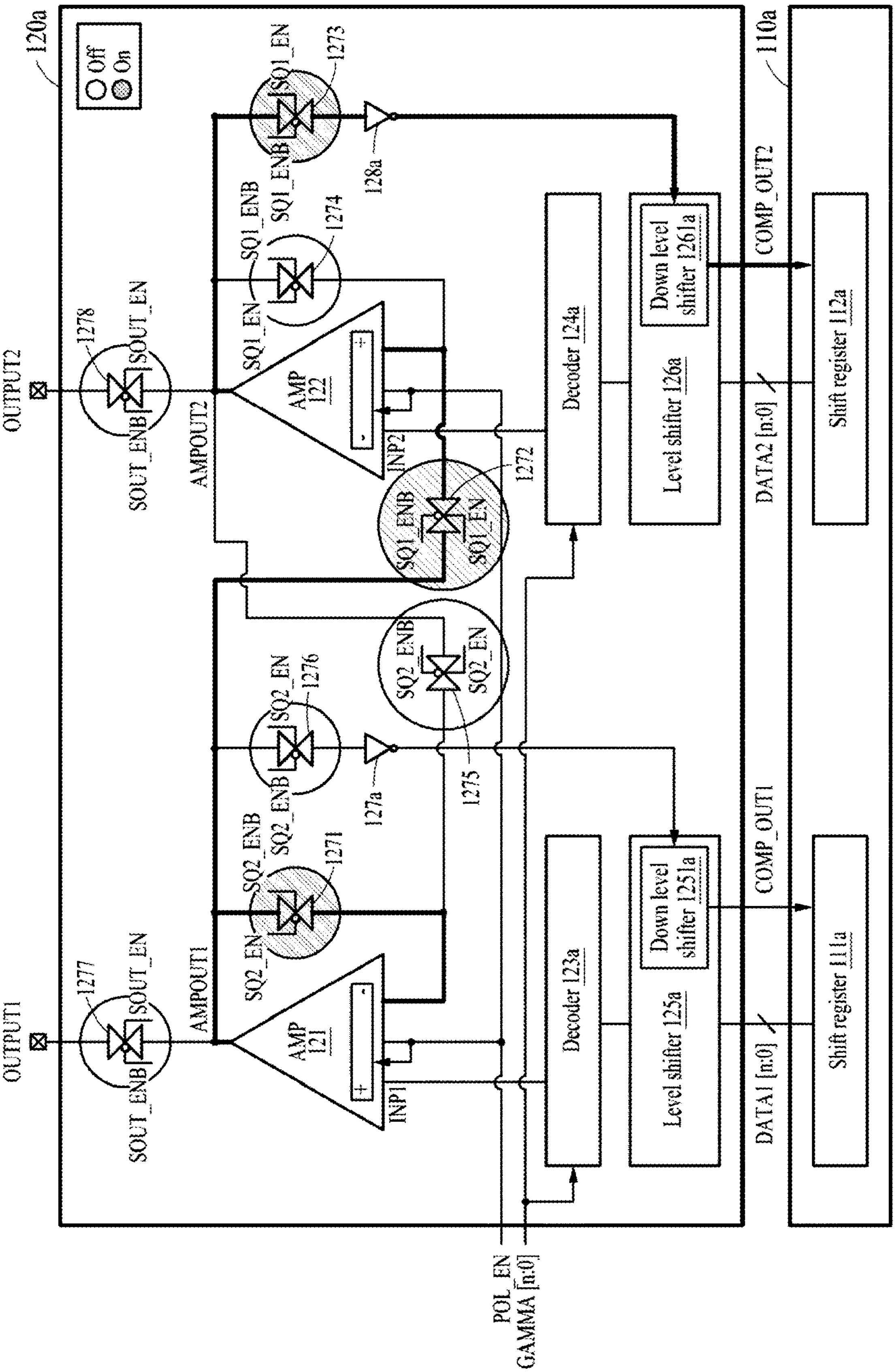
FIGS. 5 and 6 are diagrams illustrating examples of digital logic and operations of display driving circuits in calibration sequences according to some example embodiments.
Figure 6:
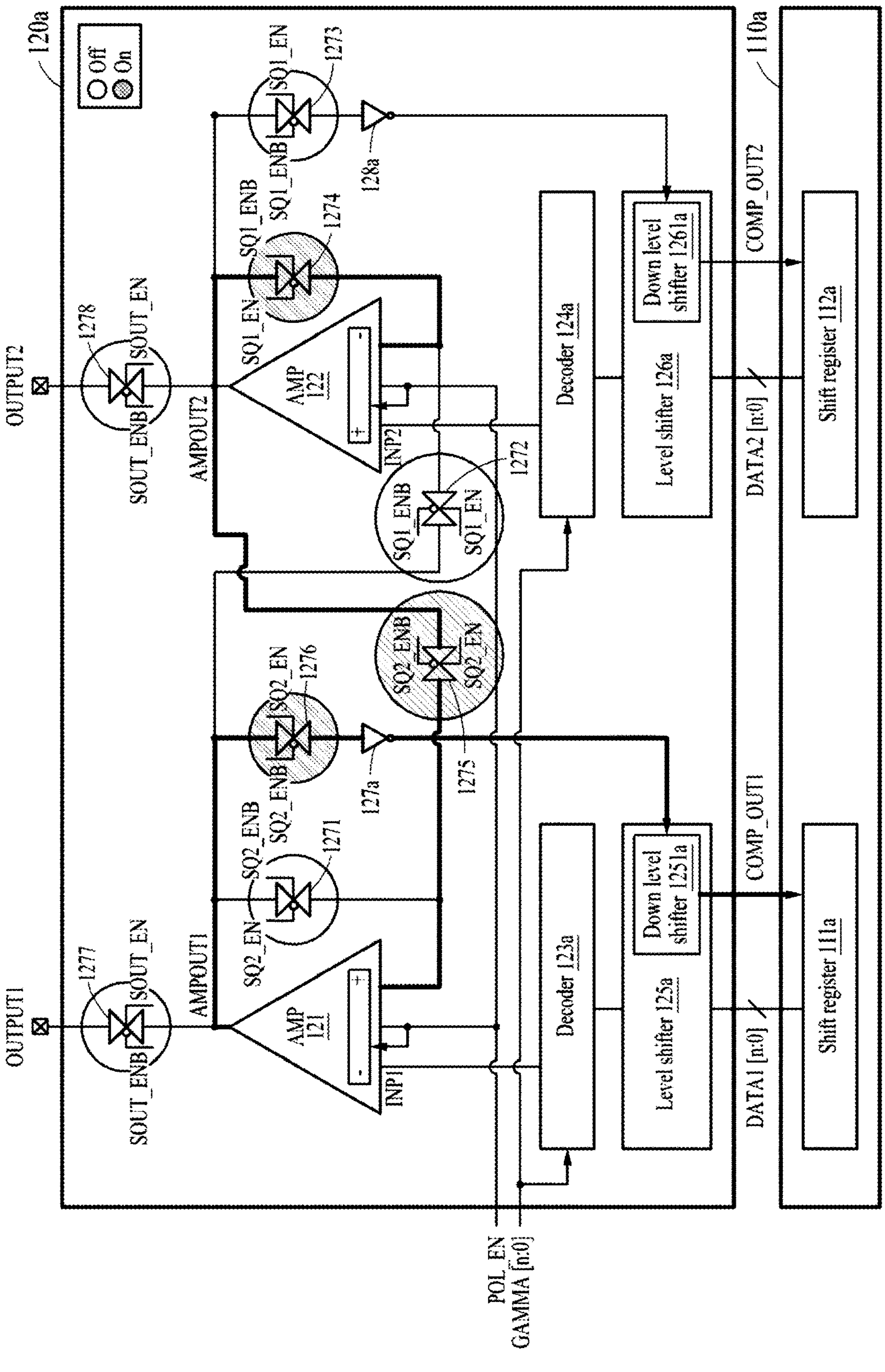

FIGS. 5 and 6 are diagrams illustrating examples of digital logic and operations of display driving circuits in calibration sequences according to some example embodiments.

Referring to FIG. 5, the seventh switch 1277 and the eighth switch 1278 may be turned off during the calibration sequences, but are not limited thereto. As the seventh switch 1277 and the eighth switch 1278 are turned off, the calibration sequences may be performed while outputs of the first and second pixel signals OUTPUT1 and OUTPUT2 are blocked, etc.

In the first calibration sequence, the first switch 1271 may be turned on and the fourth switch 1274 may be turned off, but are not limited thereto. As the first switch 1271 is turned on, the first amplifier 121 may function as an amplifier. As the fourth switch 1274 is turned off, the second amplifier 122 may function as a comparator. In the first calibration sequence, the second switch 1272 and the third switch 1273 may be turned on, and the fifth switch 1275 and the sixth switch 1276 may be turned off, but are not limited thereto. As the second switch is turned on, the output signal AMPOUT1 of the first amplifier 121 may be provided to the second input terminal of the second amplifier 122. The output signal AMPOUT1 of the first amplifier 121 may be a first output voltage generated by amplifying the first input voltage. As the third switch 1273 is turned on, the output signal AMPOUT2 of the second amplifier 122 may be provided to the second level shifter 126*a* (e.g., the second down-level shifter 1261*a*). A second inverter 128*a* may be between the third switch 1273 and the second level shifter 126*a*. The output signal AMPOUT2 of the second amplifier 122 may be a comparison result of the first output voltage and the first reference voltage.

Referring to FIG. 6, in the second calibration sequence, the first switch 1271 may be turned off and the fourth switch 1274 may be turned on, but are not limited thereto. As the first switch 1271 is turned off, the first amplifier 121 may function as a comparator. As the fourth switch 1274 is turned on, the second amplifier 122 may function as an amplifier. In the second calibration sequence, the second switch 1272 and the third switch 1273 may be turned off and the fifth switch 1275 and the sixth switch 1276 may be turned on, but the example embodiments are not limited thereto. As the fifth switch is turned on, the output signal AMPOUT2 of the second amplifier 122 may be provided to the second input terminal of the first amplifier 121. The output signal AMPOUT2 of the second amplifier 122 may be a second output voltage generated by amplifying the second input voltage. As the sixth switch 1276 is turned on, the output signal AMPOUT1 of the first amplifier 121 may be provided to the first level shifter 125*a* (e.g., the first down-level shifter 1251*a*). A first inverter 127*a* may be between the sixth switch 1276 and the first level shifter 125*a*. The output signal AMPOUT1 of the first amplifier 121 may be a comparison result of the second output voltage and the second reference voltage.

The number of amplifiers of the source driver 120*a* may increase according to and/or based on the resolution of the display panel. When multiple amplifiers operate as comparators, differences may occur in the comparison operation speed and/or comparison voltage ranges, etc. The differences may degrade and/or reduce the uniformity of the comparison operations. According to at least one example embodiment, a polarity of an amplifier performing the amplification operation may be set to the opposite polarity of a polarity of an amplifier performing the comparison operation in the calibration sequences to improve and/or increase the uniformity of the comparison operations, etc. For example, the second amplifier 122 may be set to an opposite polarity to the first amplifier 121 during the calibration sequences. The polarity setting may decrease and/or minimize the influence of a layout effect using a positive feedback operation and may increase and/or improve the uniformity of the comparison operation speed.

For example, in the first calibration sequence of FIG. 5, the first input terminal of the first amplifier 121 may be controlled and/or set to have a positive polarity, and the second input terminal of the first amplifier 121 may be controlled and/or set to have a negative polarity, but the example embodiments are not limited thereto. On the other hand, during the first calibration sequence, the first input terminal of the second amplifier 122 may be controlled and/or set to have a negative polarity, and the second input terminal of the second amplifier 122 may be controlled and/or set to have a positive polarity, etc. During the second calibration sequence of FIG. 6, the first input terminal of the second amplifier 122 may be controlled and/or set to have a positive polarity and the second input terminal of the second amplifier 122 may be controlled and/or set to have a negative polarity, etc. On the other hand, during the second calibration sequence, the first input terminal of the first amplifier 121 may be controlled and/or set to have a negative polarity and the second input terminal of the first amplifier 121 may be controlled and/or set to have a positive polarity, etc.

The polarity setting may be set and/or controlled based on the polarity control signal POL_EN. The polarity control signal POL_EN may be used to apply the chopping method to the amplifiers of the source driver 120*a* including, e.g., the first and second amplifiers 121 and 122, but is not limited thereto. The polarity setting to set, improve, and/or secure the uniformity of the comparison operation speed in at least one example embodiment may be set and/or controlled using the polarity control signal POL_EN used for the chopping method but may be distinguished from the chopping method. For example, the chopping method may be used when the display driver circuit is in a high-frequency operation mode, but the example embodiments are not limited thereto. According to the chopping method, the polarity control signal POL_EN may be provided to both the first amplifier 121 and the second amplifier 122, but is not limited thereto. The polarity setting in at least one example embodiment may be used when the display driver circuit is in a low-frequency operation mode. According to the polarity setting in at least one example embodiment, the polarity control signal POL_EN may be provided to the first amplifier 121 without modification (e.g., without inversion), and an inverted polarity control signal POL_EN may be provided to the second amplifier 122, but the example embodiments are not limited thereto. An inverted signal of the polarity control signal POL_EN may be referred to as a second polarity control signal. The first amplifier 121 and the second amplifier 122 may have opposite polarities to each other based on the polarity control signal POL_EN and the second polarity control signal, etc.

According to the chopping method, the representation of an offset may be reduced and/or suppressed by changing and/or continuously changing the polarity of each amplifier. For example, an offset of the first amplifier 121 when the first input terminal of the first amplifier 121 has a positive polarity and the second input terminal of the first amplifier 121 has a negative polarity may be different from an offset of the first amplifier 121 when the first input terminal of the first amplifier 121 has a negative polarity and the second input terminal of the first amplifier 121 has a positive polarity, etc. A polarity change of the first amplifier 121 may be performed by the polarity control signal POL_EN and the chopping method may be implemented. When the polarity of the first amplifier 121 is rapidly and alternately changed through the chopping method, in other words, when a polarity change is performed such that the first input terminal alternately has the positive polarity and the negative polarity, and at the same time, a polarity change is performed such that the second input terminal alternately has the negative polarity and the positive polarity, the offsets, which are different from each other, may complement each other and may be difficult to be perceived by human eyes and/or may be imperceptible to the human eye.

The chopping method may be effective in a high-frequency display mode with a high frame rate. In a low-frequency display mode, the polarity change may be perceptible to human eyes, and the offsets, which are different from each other, may not complement each other and/or may be perceptible, etc. The offset compensation in at least one example embodiment may be used in the low-frequency display mode. According to the chopping method, the polarity of the first amplifier 121 may be changed to be the same as the polarity of the second amplifier 122, but is not limited thereto. However, according to the polarity setting in at least one example embodiment, the polarity of the first amplifier 121 may be set opposite to the polarity of the second amplifier 122.

Figure 7:
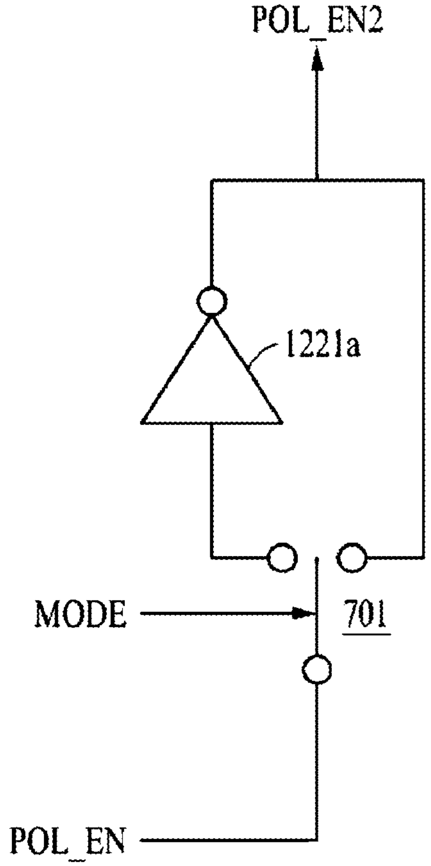
FIG. 7 is a diagram illustrating an example configuration of a display driving circuit configured to set amplifiers to opposite polarities according to at least one example embodiment.

FIG. 7 is a diagram illustrating an example configuration of a display driving circuit with amplifiers set to opposite polarities according to at least one example embodiment. An operation mode of a display driving circuit may include a low-frequency display mode and a high-frequency display mode, but the example embodiments are not limited thereto. The display driving circuit may perform offset compensation using the chopping method in the high-frequency display mode and may perform offset compensation using a compensation value in the low-frequency display mode, but is not limited thereto. The operation mode may be controlled by a mode control signal MODE.

Referring to FIG. 7, polarities of a plurality of amplifiers may be controlled by a polarity control signal POL_EN and/or a second polarity control signal POL_EN2, but the example embodiments are not limited thereto. For example, the polarity control signal POL_EN may be provided to a first amplifier, and the second polarity control signal POL_EN2 may be provided to a second amplifier, etc. An inverter 1221*a* and/or a switch 701 may be inside or outside of the second amplifier. The inverter 1221*a* may invert the polarity control signal POL_EN and may output the second polarity control signal POL_EN2.

When the inverter 1221*a* is activated in the low-frequency display mode, a first type of offset compensation using compensation values including the first compensation value may be performed. In this case, the second polarity control signal POL_EN2 may be set to be an inverted signal of the polarity control signal POL_EN through the mode control signal MODE. For example, as shown in FIG. 7, when the inverter 1221*a* is activated using the switch 701, an inverted signal of the polarity control signal POL_EN may be provided as the second polarity control signal POL_EN2. The second amplifier may be set to an opposite polarity to the first amplifier based on the second polarity control signal POL_EN2. As described above, a speed difference in a comparison operation between amplifiers operating as comparators may be compensated for by setting the first amplifier and the second amplifier to have opposite polarities to each other.

When the inverter 1221*a* is deactivated in the high-frequency mode, a second type of offset compensation using the chopping method may be performed, but the example embodiments are not limited thereto. In this case, the second polarity control signal POL_EN2 may be set to be the same as the polarity control signal POL_EN through the mode control signal MODE. For example, as shown in FIG. 7, when the inverter 1221*a* is deactivated using the switch 701, the polarity control signal POL_EN may be provided to the second polarity control signal POL_EN2.

Figure 8:
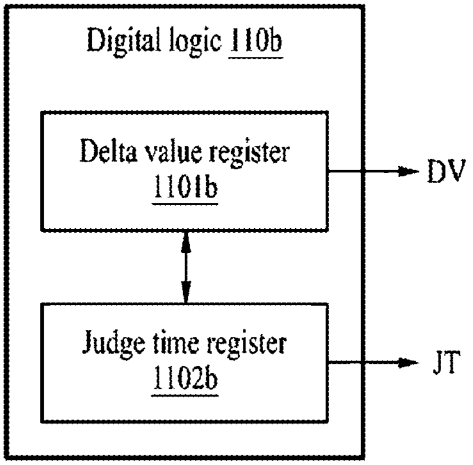
FIG. 8 is a diagram illustrating an example configuration of a display driving circuit configured to control a delta value and a judge time according to at least one example embodiment.

FIG. 8 is a diagram illustrating an example configuration of a display driver circuit configured to control a delta value and a judge time according to at least one example embodiment. Referring to FIG. 8, a digital logic 110*b* may include a delta value register 1101*b* and/or a judge time register 1102*b*, etc., but the example embodiments are not limited thereto. According to some example embodiments, the digital logic 110*b*, the delta value register 1101*b*, and/or the judge time register 1102*b*, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

Among a plurality of amplifiers of the source driver, differences may occur in the comparison operation speed and/or the comparison voltage ranges between the amplifiers of the source driver operating as comparators. According to at least one example embodiment, a difference in the comparison voltage range may be adjusted by controlling a variance of reference voltages (e.g., the first reference voltages of the first calibration sequence and/or the second reference voltages of the second calibration sequence, etc.) by using the delta value register 1101*b*. For example, in the first calibration sequence, the second decoder may select one or more first reference voltages from and/or based on one or more gamma voltages. The first reference voltages may be sequentially provided to the second amplifier in an increasing direction (e.g., increasing voltage values) or a decreasing direction (e.g., decreasing voltage values). The second amplifier may sequentially compare a first output voltage with the first reference voltages and may sequentially output first comparison results. In this case, when the variance of the first reference voltages is small (e.g., under a desired threshold value), an amplifier offset may be detected at high precision, but the size of a maximum detectable offset may be small. However, if the size of the maximum detectable offset is small, an offset may not be detected in amplifiers performing comparator operations. In this case, offset compensation of amplifiers may not be uniformly performed.

The delta value register 1101*b* may set the variance and/or range of the plurality of reference voltages. In other words, a lookup table stored in the delta value register 1101*b*, may store a plurality of reference voltage values that may be searched using data values and/or gamma voltage values, etc. For example, the delta value register 1101*b* may store a lookup table of data values as shown in Table 1 below, but the example embodiments are not limited thereto, and, e.g., other data values and/or reference voltages may be used.

TABLE 1

| | COMP_DATA_MODE[1:0] | | | |
|---|---|---|---|---|
| DATA(Δ) | d'0 | d'1 | d'2 | d'3 |
| 0 | 0 | | | |
| 1 | 1 | 1 | | |
| 2 | 2 | | | |
| 3 | 3 | 3 | 3 | |
| 4 | 4 | | | |
| 5 | 5 | 5 | | |
| 6 | 6 | | | |
| 7 | 7 | 7 | 7 | 7 |

In Table 1, the column DATA(Δ) may denote data values and the columns d'0 to d'3 may denote comparison data modes. The comparison data mode may be selected using a signal COMP_DATA_MODE, etc. Table 1 shows an example where four comparison data modes are provided by COMP_DATA_MODE, but the example embodiments are not limited thereto, and there may be a greater or lesser number of comparison data modes. A maximum data value may be set by a value MAX_DATA_SEL.

For example, when the comparison data mode d'0 is selected by COMP_DATA_MODE and "2" is set to be the maximum data value by MAX_DATA_SEL, the reference voltages may be selected using data values of 0, 1, and 2, but the example embodiments are not limited thereto. In this case, the data values of 0, 1, and 2 may be output as an output value DV of the delta value register 1101*b*. As another example, when the comparison data mode d'1 is selected by COMP_DATA_MODE and "5" is set to be the maximum data value by MAX_DATA_SEL, the reference voltages may be selected using data values of 1, 3, and 5. In this case, the data values of 1, 3, and 5 may be output as an output value DV of the delta value register 1101*b*. The latter reference voltages may have a greater and/or larger variance than the former reference voltages, but are not limited thereto. A decoder (e.g., the second decoder in the first calibration sequence and the first decoder in the second calibration sequence) may select one or more reference voltages from one or more gamma voltages based on the variance and/or range of the plurality of reference voltages (e.g., the first reference voltage in the first calibration sequence and the second reference voltages in the second calibration sequence) set by the delta value register 1101*b*. The amplifiers operating as comparators among the amplifiers of the source driver may have differences in their comparison operation speeds. The differences may be considered in and/or accounted for in an aspect of judge time (e.g., evaluation time period, etc.). The judge time may be a time point and/or time period when a comparison of an output voltage with a reference voltage in a single line time period is performed. The judge time may be set to a specific time point from a start time point of the single line time period (e.g., the start time of applying the output voltage to a single line of pixels, etc.) to an end time point of the single line time period (e.g., the end time of applying the output voltage to the single line of pixels, etc.), but is not limited thereto. When the judge time is fast compared to the comparison operation speed of one amplifier, the accuracy of a comparison result may decrease.

According to at least one example embodiment, the judge time register 1102*b* may set the judge time of the single line time period, but the example embodiments are not limited thereto. The judge time register 1102*b* may output a judge time JT according to and/or based on a user setting, but is not limited thereto. For example, the judge time register 1102*b* may set the judge time (e.g., judge time period, evaluation time period, etc.) to be a specific time point and/or time period from a start time point of the single line time period to an end time point of the single line time period. The digital logic 110*b* may judge levels of comparison results (e.g., the first comparison result of the first calibration sequence and the second comparison result of the second calibration sequence) in the single line time period by setting the judge time using the judge time register, but the example embodiments are not limited thereto. For example, a level of a comparison result may be high-level or low-level, etc.

Figure 9:
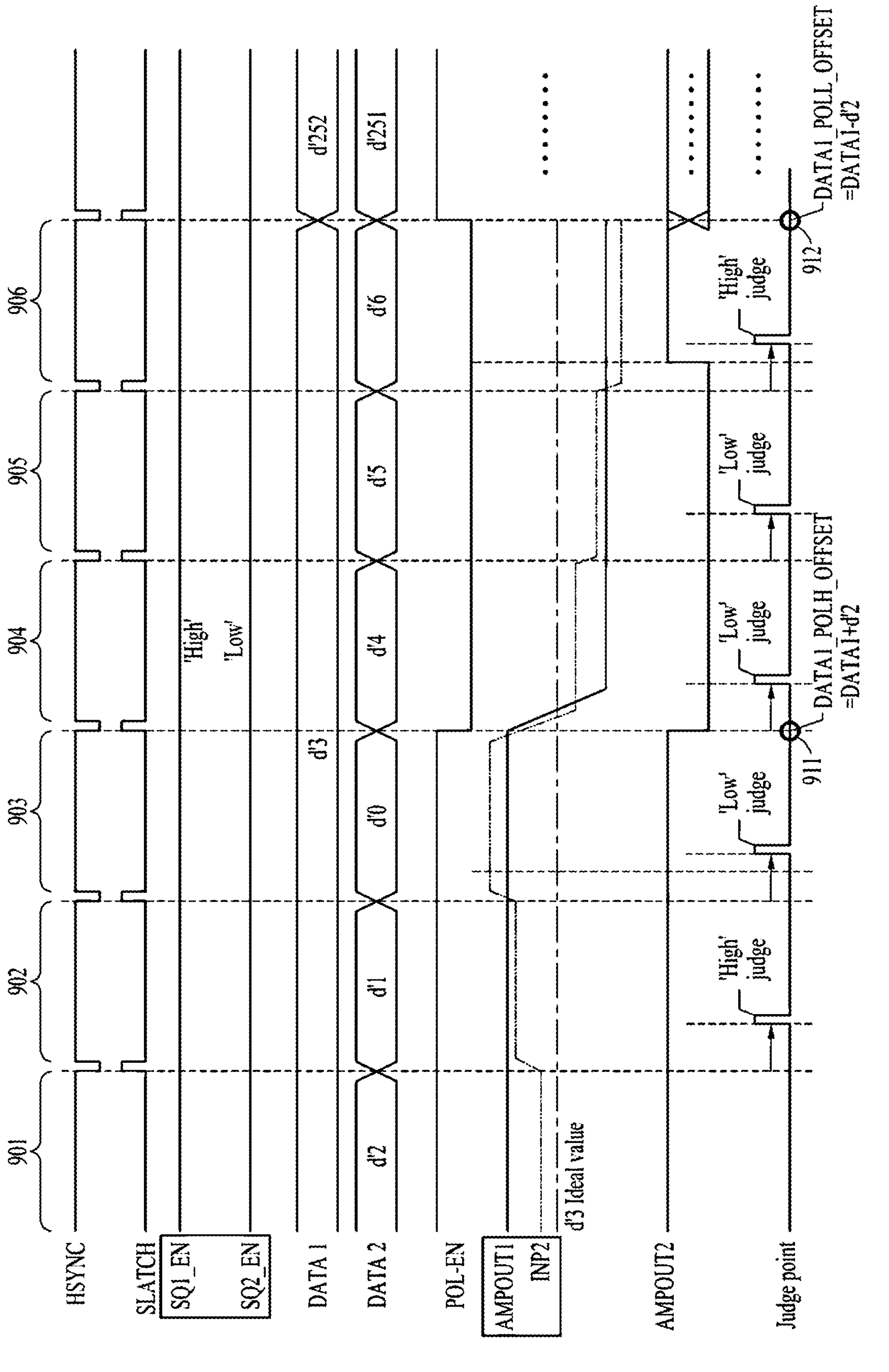
FIGS. 9 and 10 illustrate example timing diagrams of signals related to offset compensation according to some example embodiments.
Figure 10:
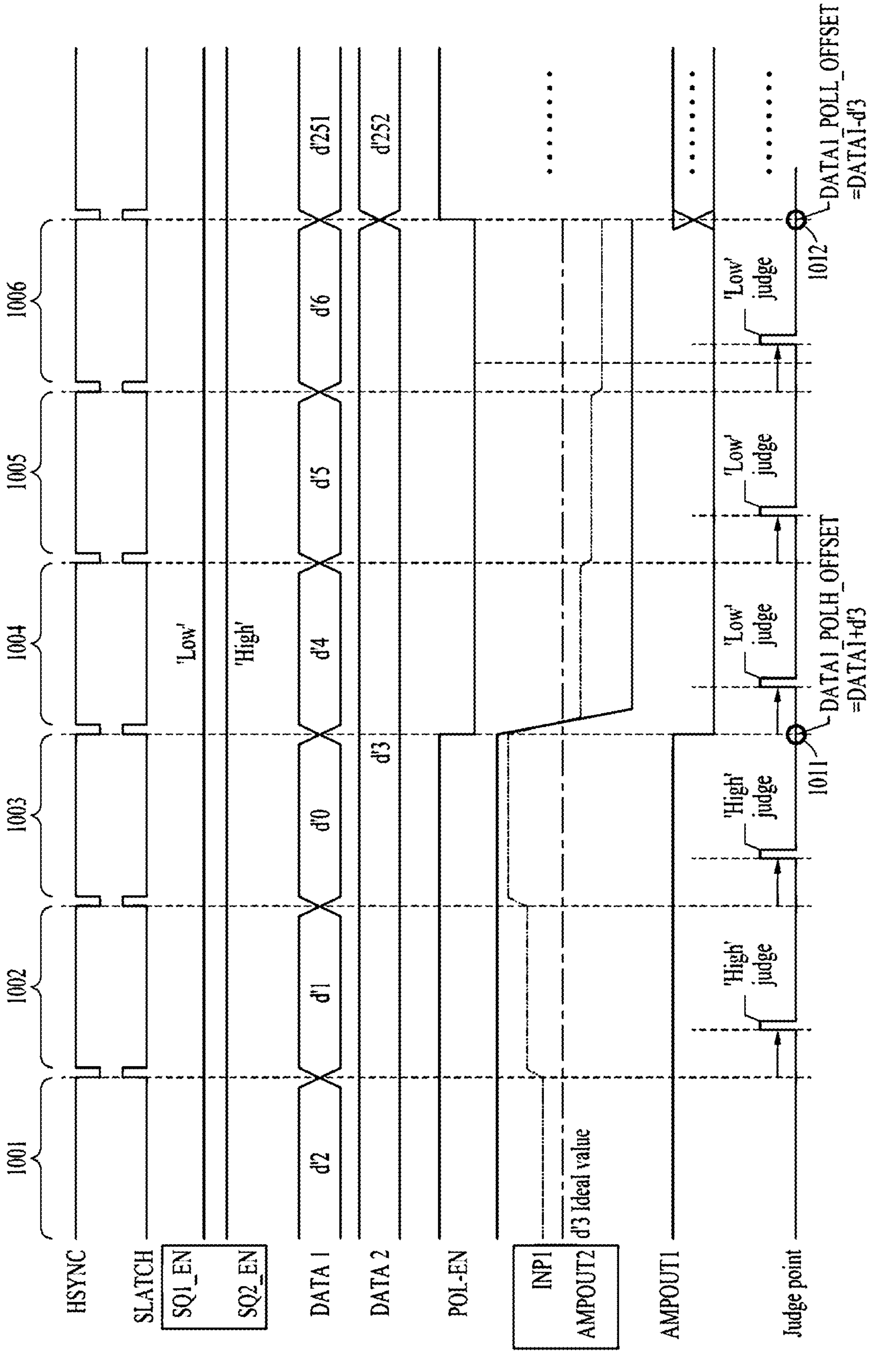

FIGS. 9 and 10 illustrate example timing diagrams of signals related to offset compensation according to some example embodiments. Referring to FIG. 9, synchronization of line processing of a display image may be performed according to and/or based on a horizontal synchronization signal HSYNC. A latch signal SLATCH may indicate that the data to be displayed is received by the source driver. First and second sequence control signals SQ1_EN and SQ2_EN may set a current calibration sequence to be a first calibration sequence or a second calibration sequence, but the example embodiments are not limited thereto. FIGS. 9 and 10 illustrate examples where the calibration sequences include the first calibration sequence and the second calibration sequence. However, the example embodiments are not limited thereto, and there may be a greater or lesser number of calibration sequences, etc. In FIG. 9, the first sequence control signal SQ1_EN may have high-level and the second sequence control signal SQ2_EN may have low-level, but are not limited thereto. Accordingly, the current calibration sequence may be set to the first calibration sequence.

A first input voltage may be selected from and/or selected based on one or more gamma voltages according to and/or based on a data value d'3 of the first data signal DATA1. For example, first to sixth line times 901 to 906 of FIG. 9 may correspond to a calibration example with respect to the data value d'3, and calibration with respect to different data values on a different line time may be performed, but the example embodiments are not limited thereto. Although FIG. 9 illustrates a calibration procedure using three data values (e.g., d'2, d'1, d'0 of first polarity calibration and d'4, d'5, d'6 of second polarity calibration), the example embodiments are not limited thereto, and a different number of data values may be used, etc. First reference voltages may be selected from and/or selected based on the gamma voltages according to and/or based on data values d'2, d'1, and d'0 of the second data signal DATA2. In response to the polarity control signal POL_EN, calibration may be performed with respect to a case in which the first amplifier has a first polarity in the first to third line times 901 to 903, and calibration may be performed with respect to a case in which the first amplifier has a second polarity in the fourth to sixth line times 904 to 906, but the example embodiments are not limited thereto.

The first output signal AMPOUT1 may be different from an ideal voltage value and/or expected voltage value, e.g., the reference voltage value, due to a first offset. Accordingly, the first output voltage of the first output signal AMPOUT1 may be compared with the first reference voltages (e.g., the ideal voltage value and/or the expected voltage value corresponding to the input data value and/or gamma voltage, etc.) of the second input signal INP2. A plurality of first reference voltages corresponding to the data values d'2, d'1, and d'0 may be provided to the second amplifier in the first to third line times 901 to 903, and a plurality of first reference voltages corresponding to the data values d'4, d'5, and d'6 may be provided to the second amplifier in the fourth to sixth line time 904 to 906, etc., but the example embodiments are not limited thereto. The second output signal AMPOUT2 may represent a first comparison result of the second amplifier. In the first and second line times 901 and 902, the first output signal AMPOUT1 may be greater than the second input signal INP2, and accordingly, the second output signal AMPOUT2 may have high-level, but the example embodiments are not limited thereto. In the third line time 903, the second input signal INP2 may be greater than the first output signal AMPOUT1, and accordingly, the second output signal AMPOUT2 may have low-level, but the example embodiments are not limited thereto.

The digital logic may judge and/or evaluate the comparison result at a judge point (e.g., a judge time period, evaluation time period, etc.). In the second line time 902, the high-level may be judged and in the third line time 903, the low-level may be judged. According to the level change as described above, the digital logic may determine the first offset of the first output voltage at a first time point 911. For example, the data value d'2 corresponding to a difference between the data value d'3 of the first input voltage and the data value d'1 before the level change may be determined to be an offset of the first polarity of the first amplifier. At a second time point 912, the data value d'2 may be determined to be an offset of the second polarity of the first amplifier. The first offset of the first amplifier may be determined based on the offset of the first polarity of the first amplifier and/or the offset of the second polarity of the first amplifier.

Referring to FIG. 10, the first sequence control signal SQ1_EN may have a low-level and the second sequence control signal SQ2_EN may have a high-level, but the example embodiments are not limited thereto. Accordingly, the current calibration sequence may be set to the second calibration sequence.

A second input voltage may be selected from and/or selected based on the one or more gamma voltages according to and/or based on a data value d'3 of the second data signal DATA2, etc. Second reference voltages (e.g., the ideal voltage value and/or the expected voltage value corresponding to the input data value and/or gamma voltage, etc.) may be selected from and/or selected based on the one or more gamma voltages according to and/or based on data values d'2, d'1, and d'0 of the first data signal DATA1, etc. In response to the polarity control signal POL_EN, calibration with respect to a case in which the second amplifier has a first polarity in a plurality of line times, e.g., first to third line times 1001 to 1003, etc., may be performed, and calibration with respect to a case in which the second amplifier has a second polarity in a plurality of line times, e.g., fourth to sixth line times 1004 to 1006, etc., may be performed.

The second output voltage of the second output signal AMPOUT2 may be compared with the second reference voltages of the first input signal INP1. Second reference voltages corresponding to the data values d'2, d'1, and d'0 may be provided to the first amplifier in the first to third line times 1001 to 1003, and second reference voltages corresponding to the data values d'4, d'5, and d'6 may be provided to the first amplifier in the fourth to sixth line time 1004 to 1006, etc. The first output signal AMPOUT1 may represent a second comparison result of the first amplifier. In the first to third line times 1001 to 1003, the second output signal AMPOUT2 may be greater than the first input signal INP1, and accordingly, the first output signal AMPOUT1 may have a high-level, but the example embodiments are not limited thereto.

The digital logic may judge the comparison result at a judge point. The high-level may be judged in both second and third line times 1002 and 1003, but is not limited thereto. As described above, when there is no change in the level, a maximum detectable offset may be determined to be an offset of the second output voltage. In the example of FIG. 10, since offset detection is performed using three data values, the data value d'3 may be the maximum detectable offset, but the example embodiments are not limited thereto.

Figure 11:
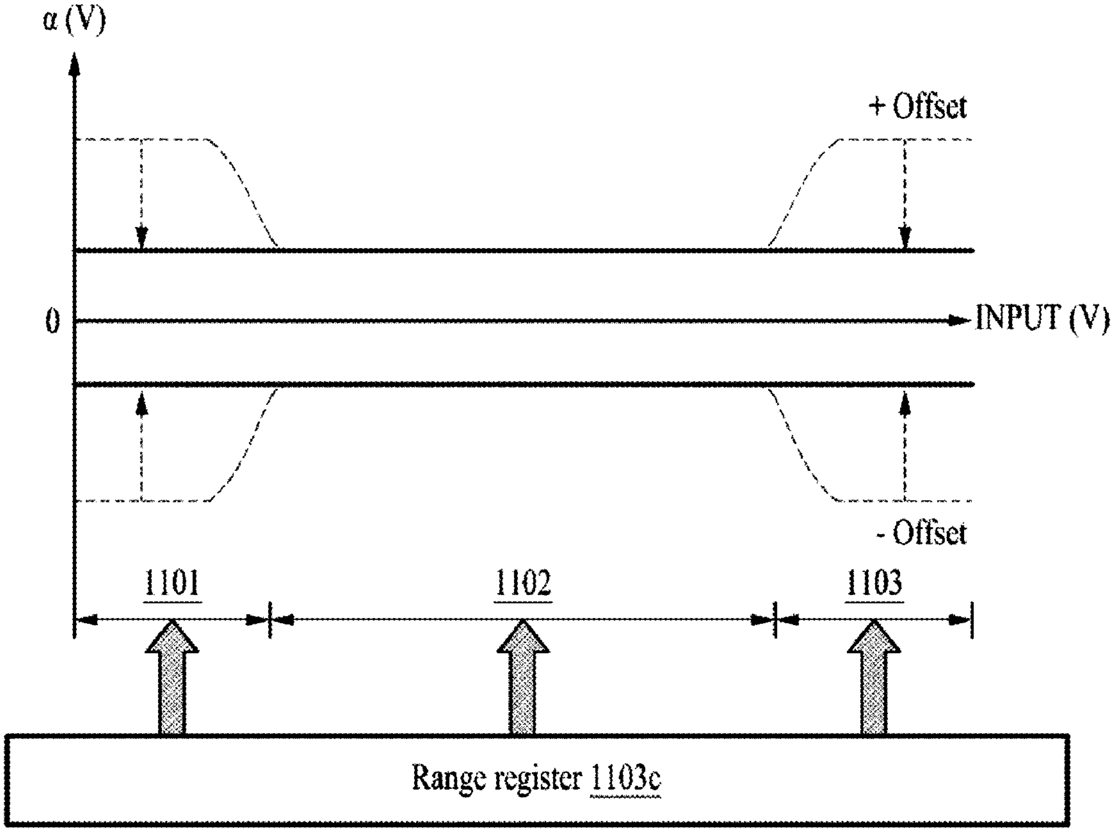
FIGS. 11 and 12 are diagrams illustrating example configurations of display driving circuits configured for offset compensation based on representative values according to some example embodiments.
Figure 12:
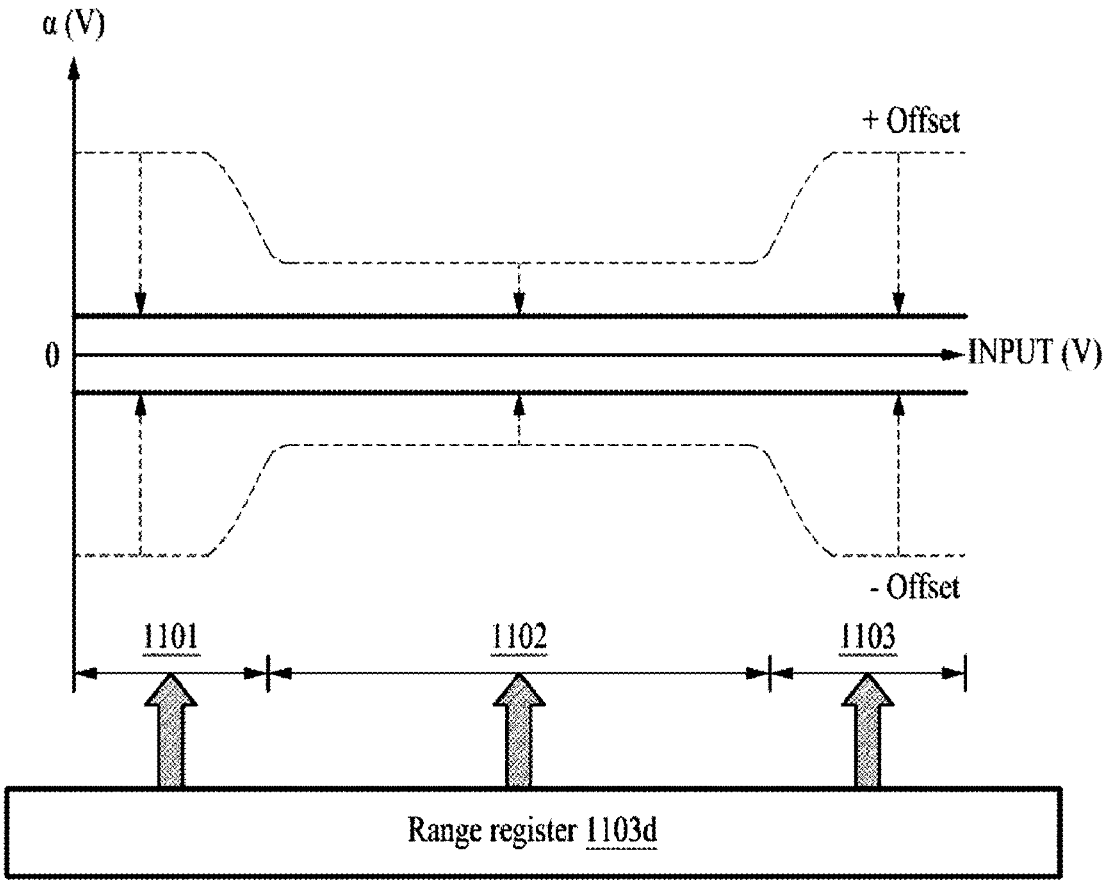

FIGS. 11 and 12 are diagrams illustrating example configurations of display driving circuits for offset compensation based on a representative value according to some example embodiments. FIGS. 9 and 10 may correspond to a calibration example with respect to the data value d'3, and calibration with respect to other data values may be performed, but the example embodiments are not limited thereto. For example, it may be inefficient to perform calibration on the entire input voltage range of all data values, thus, according to at least one example embodiment, representative compensation values for partial sections (e.g., partial time periods, subsets, etc.) of an input voltage section of an amplifier (e.g., the first amplifier and/or the second amplifier, etc.) may be determined based on representative input voltages of the partial sections, and each representative compensation value may be used to determine an offset of an output voltage according to and/or based on an input voltage of each partial section. For example, as shown in FIGS. 11 and 12, representative compensation values for the first to third partial sections 1101 to 1103 may be used, but the example embodiments are not limited thereto. For example, the first partial section 1101 may be a PMOS section, the second partial section 1102 may be a CMOS section, and/or the third partial section 1103 may be an NMOS section, etc., but the example embodiments are not limited thereto.

Referring to FIG. 11, a range register 1103*c* may store a plurality of representative compensation values corresponding to a plurality of partial sections, such as first to third representative compensation values for the first to third partial sections 1101 to 1103, etc., but the example embodiments are not limited thereto. Offsets of output voltages according to, based on, and/or corresponding to input voltages of the first partial section 1101 may be compensated by the first representative compensation value, offsets of output voltages according to, based on, and/or corresponding to input voltages of the second partial section 1102 may be compensated by the second representative compensation value, and offsets of output voltages according to, based on, and/or corresponding to input voltages of the third partial section 1103 may be compensated by the third representative compensation value, etc. For example, when the first input voltage is a representative input voltage of the first partial section 1101, the offsets of the output voltages according to, based on, and/or corresponding to the input voltages of the first partial section 1101 may be compensated by a first compensation value according to, based on, and/or corresponding to the first input voltage.

As described above with reference to FIG. 8, the variance of reference voltages may be set based on the delta value register 1101*b* of FIG. 8, but are not limited thereto. FIG. 11 illustrates an example that the first to third representative compensation values of the first to third sections 1101 to 1103 are determined without adjusting the variance of the reference voltages. For example, such as the comparison data mode of d'2 or the comparison data mode of d'3 of Table 1, a relatively large variance may be used to determine a compensation value. In this case, a relatively large offset of the first and third partial sections 1101 and 1103 may be detected, but a relatively small offset of the second partial section may not be detected.

FIG. 12 illustrates an example method of determining the first to third representative compensation values of the first to third partial sections 1101 to 1103 by adjusting the variance of the reference voltages. For example, a relatively large variance, such as the comparison data mode of d'2 and/or the comparison data mode of d'3, etc., may be used to detect a relatively large offset of the first and third partial sections 1101 and 1103. A relatively small variance, such as the comparison data mode of d'0 and/or the comparison data mode of d'1, etc., may be used to detect a relatively small offset of the second partial section 1102. In this case, a relatively large offset of the first and third partial sections 1101 and 1103 may be detected using the relatively large variance, and a relatively small offset of the second partial section 1102 may be detected using the relatively small variance.

Figure 13:
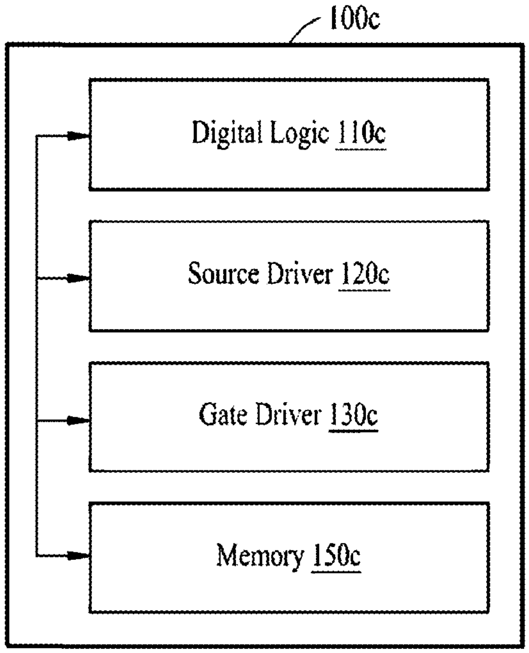
FIGS. 13 and 14 are diagrams illustrating example configurations of display driving circuits configured to apply derived compensation values according to some example embodiments.
Figure 14:
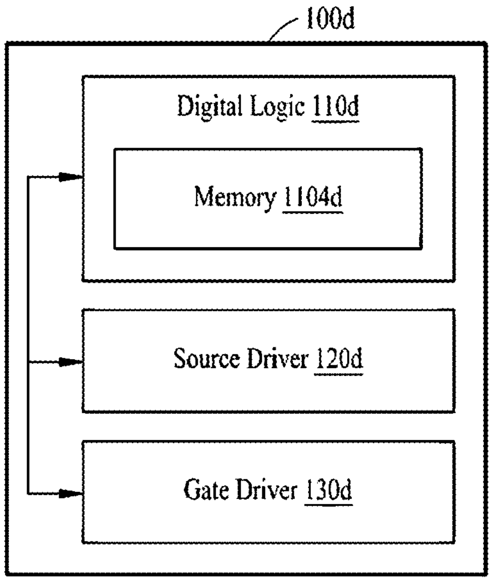

FIGS. 13 and 14 are diagrams illustrating example configurations of display driving circuits configured to apply derived compensation values according to some example embodiments.

When an offset of an output voltage according to an input voltage (e.g., the representative input voltage) of an amplifier (e.g., the first amplifier and/or the second amplifier) is determined, a compensation value for the offset may be determined. For example, in the example of FIG. 9, the data value d'2 may be determined to be the offset and/or a compensation value to compensate for the offset may be determined, etc. The compensation value may be a digital value, and the offset compensation according to some example embodiments may be performed in a direct compensation scheme using a digital value.

Referring to FIG. 13, a display driving circuit 100*c* may include a digital logic 110*c* (e.g., digital logic circuitry, etc.), a source driver 120*c*, a gate driver 130*c*, and/or a memory 150*c*, etc., but the example embodiments are not limited thereto. The memory 150*c* may store compensation values, etc. For example, the memory 150*c* may be a one-time programmable (OTP) memory, but the example embodiments are not limited thereto. In this case, the compensation values may be determined through an electrical die sorting (EDS) test, but the example embodiments are not limited thereto. The compensation values may be determined based on an output voltage of a gamma look-up table (LUT).

Referring to FIG. 14, a display driving circuit 100*d* may include a digital logic 110*d* (e.g., digital logic circuitry, etc.), a source driver 120*d*, and/or a gate driver 130*d*, etc., but is not limited thereto. The digital logic 110*d* may include a memory 1104*d*, but is not limited thereto. For example, the memory 1104*d* may be a line buffer, but is not limited thereto. In this case, the compensation values may be determined in an actual use environment of a customer, etc., but is not limited thereto. The compensation values may be determined based on an output voltage of a gamma LUT. According to some example embodiments, the digital logic 110*d*, the memory 1104*d*, the source driver 120*d*, and/or the gate driver 130*d*, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The compensation values may be stored as digital values in, for example, the memory 150*c* of FIG. 13 and/or the memory 1104*d* of FIG. 14, etc. The digital logic 110*c* of FIG. 13 and/or the digital logic 110*d* of FIG. 14 may generate at least one data signal by reflecting the compensation value in each data value. For example, when the first input voltage corresponding to the first data value is to be provided to the first amplifier, the digital logic 110*c* and/or the digital logic 110*d* may determine a new first data value by reflecting the first offset related to the first data value in the first data value, and may generate a data signal to provide a new first input voltage corresponding to the new first data value to the first amplifier.

Figure 15:
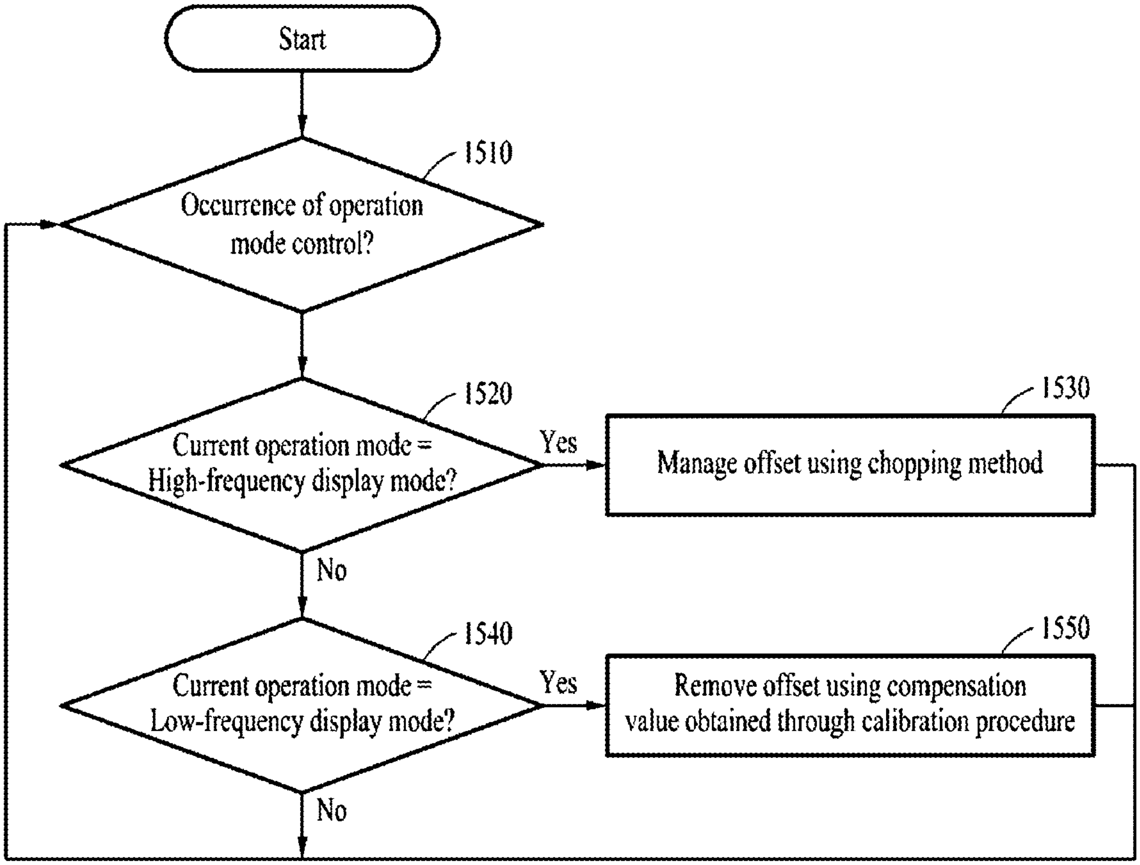
FIG. 15 is a flowchart illustrating an example of an offset compensation operation for each operation mode according to at least one example embodiment.

FIG. 15 is a flowchart illustrating an example of an offset compensation operation for each operation mode according to at least one example embodiment. Referring to FIG. 15, in operation 1510, the digital logic of a display driver circuit may determine whether an operation mode control has occurred (e.g., may determine whether an operation mode of the display driving circuit has been set). An operation mode of a display driving circuit may include a low-frequency display mode and a high-frequency display mode, but is not limited thereto, and for example, the display driving circuit may include a greater or lesser number of display modes. According to and/or based on the operation mode control, a current operation mode of the display driving circuit may be set to the low-frequency display mode or the high-frequency display mode, etc.

In operation 1520, the digital logic may determine whether the current operation mode of the display driving circuit is the high-frequency mode. When the current operation mode is the high-frequency display mode, in operation 1530, the digital logic may manage an offset using the chopping method, but the example embodiments are not limited thereto. When the current operation mode is not the high-frequency display mode, operation 1540 may be performed.

In operation 1540, the digital logic may determine whether the current operation mode of the display driving circuit is the low-frequency display mode. When the current operation mode is the low-frequency display mode, in operation 1550, the digital logic may perform offset removal using at least one compensation value obtained through at least one calibration procedure, but is not limited thereto. For example, when compensation values are determined in calibration sequences, the digital logic may use the compensation values to compensate for offsets of output voltages in the low-frequency display mode.

Figure 16:
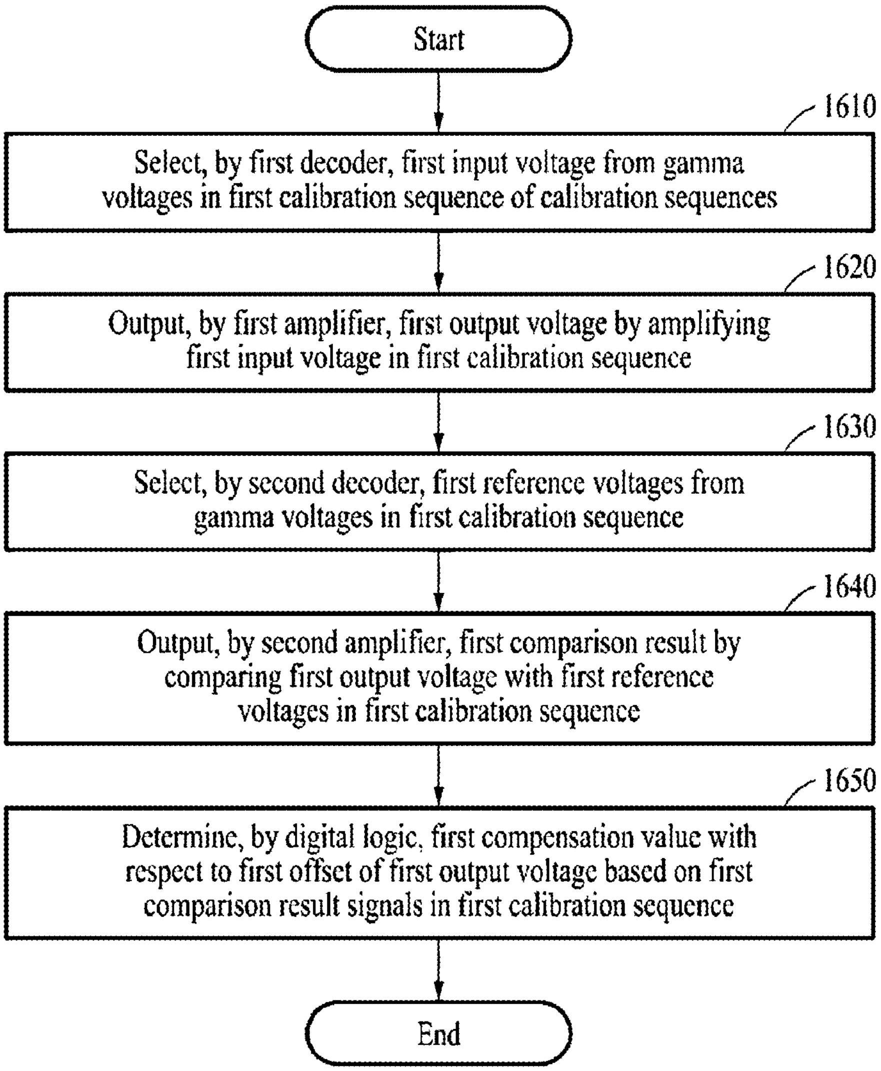
FIG. 16 is a flowchart illustrating an example display driving method for amplifier offset compensation according to at least one example embodiment.

FIG. 16 is a flowchart illustrating an example display driving method for amplifier offset compensation according to at least one example embodiment. Referring to FIG. 16, in operation 1610, a display driving circuit may select a first input voltage from one or more gamma voltages using a first decoder in a first calibration sequence of a plurality of calibration sequences, and may output a first output voltage by amplifying the first input voltage using a first amplifier during the first calibration sequence. In operation 1620, the display driving circuit may select one or more first reference voltages from and/or selected based on the one or more gamma voltages using a second decoder in the first calibration sequence, and in operation 1630, the display driving circuit may output a first comparison result generated by a second amplifier by comparing the first output voltage with the first reference voltages during the first calibration sequence. In operation 1640, the display driving circuit may determine a first compensation value with respect to a first offset of the first output voltage based on the first comparison result using a digital logic during the first calibration sequence. In the calibration sequences, the second amplifier may be set to have polarity opposite to a polarity of the first amplifier.

As described above, although various example embodiments have been described with reference to the limited drawings, a person of ordinary skill in the art may apply various technical modifications and variations based thereon. For example, suitable results may be achieved if the described operations of the methods are performed in a different order and/or combined, and/or if components in a described system, architecture, device, and/or circuit are combined in a different manner and/or replaced or supplemented by other components or their equivalents.

Accordingly, other implementations are within the scope of the following claims.

What is claimed is:

1. A display driving circuit comprising:

a first decoder configured to select a first input voltage based on one or more gamma voltages during a first calibration sequence of a plurality of calibration sequences;

a first amplifier configured to generate and output a first output voltage during the first calibration sequence, the first output voltage generated by amplifying the first input voltage;

a second decoder configured to select one or more first reference voltages based on the one or more gamma voltages during the first calibration sequence;

a second amplifier configured to output a first comparison result during the first calibration sequence based on the first output voltage and the one or more first reference voltages; and processing circuitry configured to, determine a first compensation value based on the first comparison result during the first calibration sequence, the first compensation value compensating for a first offset of the first output voltage, and during the plurality of calibration sequences, set the second amplifier to have a polarity opposite of a polarity of the first amplifier.

2. The display driving circuit of claim 1, wherein the processing circuitry is further configured to:

set the polarity of the first amplifier with a first polarity control signal; and set the second amplifier to have the polarity opposite of the polarity of the first amplifier using a second polarity control signal, the second polarity control signal being an inverted signal of the first polarity control signal.

3. The display driving circuit of claim 2, wherein the display driving circuit further comprises:

an inverter configured to output the second polarity control signal by inverting the first polarity control signal.

4. The display driving circuit of claim 3, wherein the display driving circuit is configured to, operate in an operation mode, the operation mode being one of at least a low-frequency display mode and a high-frequency display mode, perform a first type of offset compensation using the first compensation value in response to the operation mode being the low-frequency display mode, and perform a second type of offset compensation using a chopping method in response to the operation mode being the high-frequency display mode; and the inverter is configured to, activate in response to the operation mode of the display driving circuit being the low-frequency display mode; and deactivate in response to the operation mode of the display driving circuit being the high-frequency display mode.

5. The display driving circuit of claim 1, wherein the second decoder is further configured to select a second input voltage based on the one or more gamma voltages during a second calibration sequence of the plurality of calibration sequences;

the second amplifier is further configured to generate and output a second output voltage during the second calibration sequence, the second output voltage generated by amplifying the second input voltage;

the first decoder is further configured to select one or more second reference voltages based on the one or more gamma voltages during the second calibration sequence;

the first amplifier is further configured to output a second comparison result based on the second output voltage and the one or more second reference voltages during the second calibration sequence; and the processing circuitry is further configured to determine a second compensation value based on the second comparison result, the second compensation value compensating for a second offset of the second output voltage.

6. The display driving circuit of claim 5, further comprising:

a switch circuit configured to, provide a first connection path to the first amplifier and the second amplifier during the first calibration sequence, and provide a second connection path to the first amplifier and the second amplifier during the second calibration sequence;

the first amplifier is further configured to, amplify the first input voltage using the first connection path during the first calibration sequence, and compare the second output voltage with the one or more second reference voltages using the second connection path during the second calibration sequence; and the second amplifier is further configured to, compare the first output voltage with the one or more first reference voltages using the first connection path during the first calibration sequence, and amplify the second input voltage during the second calibration sequence.

7. The display driving circuit of claim 6, wherein the switch circuit comprises:

a first switch on a feedback loop of the first amplifier;

a second switch between an output terminal of the first amplifier and a second input terminal of the second amplifier;

a third switch between an output terminal of the second amplifier and a second level shifter;

a fourth switch on a feedback loop of the second amplifier;

a fifth switch between the output terminal of the second amplifier and a second input terminal of the first amplifier; and a sixth switch between the output terminal of the first amplifier and a first level shifter, wherein the processing circuitry is further configured to, during the first calibration sequence, turn the first switch, the second switch, and the third switch on, and turn the fourth switch, the fifth switch, and the sixth switch off, and during the second calibration sequence, turn the first switch, the second switch, and the third switch off, and turn the fourth switch, the fifth switch, and the sixth switch on.

8. The display driving circuit of claim 1, further comprising:

a delta value register configured to store a plurality of first reference voltages; and the second decoder is further configured to select the one or more first reference voltages from the stored plurality of first reference voltages based on the one or more gamma voltages.

9. The display driving circuit of claim 1, further comprising:

a range register configured to store a plurality of representative compensation values corresponding to a plurality of partial sections of an input voltage of the first amplifier; and the processing circuitry is further configured to, in response to a first partial section of the plurality of partial sections of the first input voltage matching a first representative compensation value of the plurality of representative compensation values, applying the first compensation value to the first output voltage to compensate for the first offset.

10. The display driving circuit of claim 1, further comprising:

a judge time register configured to set a judge time period of a single line time period, wherein the processing circuitry is further configured to set a level of the first comparison result during the single line time period using the set judge time period.

11. The display driving circuit of claim 1, wherein the display driving circuit is configured to operate in an operation mode, the operation mode being one of at least a low-frequency display mode and a high-frequency display mode; and the processing circuitry is further configured to, compensate for one or more offsets of the first and second output voltages during the low-frequency display mode using a plurality of compensation values determined during the plurality of calibration sequences.

12. A display device comprising:

a display driving circuit configured to generate at least one pixel signal corresponding to a display image; and a display panel including a plurality of pixels, the display panel configured to display the display image based on the at least one pixel signal using the plurality of pixels, wherein the display driving circuit includes, a first decoder configured to select a first input voltage based on one or more gamma voltages during a first calibration sequence of a plurality of calibration sequences;

a first amplifier configured to generate and output a first output voltage during the first calibration sequence, the first output voltage generated by amplifying the first input voltage;

a second decoder configured to select one or more first reference voltages based on the one or more gamma voltages during the first calibration sequence;

a second amplifier configured to output a first comparison result during the first calibration sequence based on the first output voltage and the one or more first reference voltages;

processing circuitry configured to, determine a first compensation value based on the first comparison result during the first calibration sequence, the first compensation value compensating for a first offset of the first output voltage, and during the plurality of calibration sequences, set the second amplifier to have a polarity opposite of a polarity of the first amplifier; and the display driving circuit is further configured to generate the at least one pixel signal based on the first compensation value.

13. The display device of claim 12, wherein the processing circuitry is further configured to:

set the polarity of the first amplifier with a first polarity control signal; and set the second amplifier to have the polarity opposite of the polarity of the first amplifier using a second polarity control signal, the second polarity control signal being an inverted signal of the first polarity control signal.

14. The display device of claim 13, wherein the display driving circuit further comprises:

an inverter configured to output the second polarity control signal by inverting the first polarity control signal.

15. The display device of claim 14, wherein the display driving circuit is further configured to, operate in an operation mode, the operation mode being one of at least a low-frequency display mode and a high-frequency display mode, perform a first type of offset compensation using the first compensation value in response to the operation mode being the low-frequency display mode, and perform a second type of offset compensation using a chopping method in response to the operation mode being the high-frequency display mode; and the inverter is configured to, activate in response to the operation mode of the display driving circuit being the low-frequency display mode, and deactivate in response to the operation mode of the display driving circuit being the high-frequency display mode.

16. The display device of claim 12, wherein the display driving circuit further includes a delta value register configured to store a plurality of first reference voltages; and the second decoder is further configured to select the one or more first reference voltages from the stored plurality of first reference voltages based on the one or more gamma voltages.

17. The display device of claim 12, wherein the display driving circuit further includes a range register configured to store a plurality of representative compensation values corresponding to a plurality of partial sections of an input voltage; and the processing circuitry is further configured to, in response to a first partial section of the plurality of partial sections of the first input voltage matching a first representative compensation value of the plurality of representative compensation values, applying the first compensation value to the first output voltage to compensate for the first offset.

18. The display device of claim 12, wherein the display driving circuit further includes a judge time register configured to set a judge time period of a single line time period; and the processing circuitry is further configured to set a level of the first comparison result during the single line time period using the set judge time period.

19. The display device of claim 12, wherein the display driving circuit is configured to operate in an operation mode, the operation mode being one of at least a low-frequency display mode and a high-frequency display mode; and the processing circuitry is further configured to, compensate for one or more offsets of the first and second output voltages during the low-frequency display mode using a plurality of compensation values determined during the plurality of calibration sequences.

20. A method of operating a display, the method comprising:

selecting, by a first decoder, a first input voltage from one or more gamma voltages during a first calibration sequence of a plurality of calibration sequences;

outputting, by a first amplifier, a first output voltage during the first calibration sequence, the first output voltage generated by amplifying the first input voltage;

selecting, by a second decoder, one or more first reference voltages based on the one or more gamma voltages during the first calibration sequence;

generating, by a second amplifier, a first comparison result based on the first output voltage and the one or more first reference voltages during the first calibration sequence;

determining, by processing circuitry, a first compensation value based on the first comparison result during the first calibration sequence, the first compensation value compensating for a first offset of the first output voltage; and setting, by the processing circuitry, the second amplifier to have a polarity opposite of a polarity of the first amplifier during the plurality of calibration sequences.

* * * * *